(12) United States Patent
Gubbins et al.

(10) Patent No.: US 9,269,377 B2
(45) Date of Patent: Feb. 23, 2016

(54) MAGNETIC HEAD WITH INTEGRATED WRITE DRIVER

(71) Applicant: Seagate Technology LLC, Cupertino, CA (US)

(72) Inventors: Mark Anthony Gubbins, Letterkenny (IE); Todd Michael Lammers, Lafayette, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 14/575,288

(22) Filed: Dec. 18, 2014

(65) Prior Publication Data

US 2015/0103442 A1 Apr. 16, 2015

Related U.S. Application Data

(63) Continuation of application No. 12/618,976, filed on Nov. 16, 2009.

(51) Int. Cl.

| | |
|---|---|
| *G11B 5/10* | (2006.01) |
| *G11B 5/09* | (2006.01) |
| *G11B 5/127* | (2006.01) |
| *G11B 5/31* | (2006.01) |
| *G11B 5/48* | (2006.01) |
| *G11B 5/60* | (2006.01) |

(52) U.S. Cl.
CPC .. *G11B 5/09* (2013.01); *G11B 5/10* (2013.01); *G11B 5/1278* (2013.01); *G11B 5/3133* (2013.01); *G11B 5/4833* (2013.01); *G11B 5/4853* (2013.01); *G11B 5/6005* (2013.01); *G11B 5/6082* (2013.01)

(58) Field of Classification Search
CPC ...... G11B 5/09; G11B 5/4833; G11B 5/6082; G11B 5/6005; G11B 5/3133; G11B 5/1278; G11B 5/10; G11B 5/4853
USPC .......................................... 360/234.4
See application file for complete search history.

(56) References Cited

U.S. PATENT DOCUMENTS

| | | | |
|---|---|---|---|
| 4,809,103 | A | 2/1989 | Lazzari |
| 5,587,857 | A | 12/1996 | Voldman et al. |
| 5,712,747 | A | 1/1998 | Voldman et al. |
| 6,118,602 | A | 9/2000 | de la Soujeole |
| 6,301,068 | B1 | 10/2001 | Ionescu |
| 6,349,009 | B1 | 2/2002 | Dakroub et al. |
| 6,404,575 | B1 | 6/2002 | Yen |
| 6,650,493 | B2 | 11/2003 | Dakroub |
| 6,671,118 | B2 | 12/2003 | Putnam et al. |
| 6,927,946 | B2 | 8/2005 | Shum et al. |
| 7,035,028 | B2 | 4/2006 | Venca et al. |
| 7,095,594 | B2 | 8/2006 | Maimone et al. |
| 7,173,781 | B2 | 2/2007 | Lim et al. |

(Continued)

OTHER PUBLICATIONS

Scavennec, et al., "Semiconductor Technologies for Higher Frequencies," IEEE Microwave Magazine, Apr. 2009, 77-87.

*Primary Examiner* — Brian Miller

(74) *Attorney, Agent, or Firm* — Hall Estill Attorneys at Law

(57) ABSTRACT

An apparatus and associated method generally relate to data writing and more specifically to writing data to a rotating media. An embodiment of such an apparatus comprises a slider body, a transducer and a write driver. The transducer comprises a writer. The write driver is integrated on the slider body, and directly connected to the writer.

20 Claims, 6 Drawing Sheets

(56) References Cited

U.S. PATENT DOCUMENTS

| | | |
|---|---|---|
| 7,365,928 B2 | 4/2008 | Venca et al. |
| 2005/0231843 A1 | 10/2005 | Venca et al. |
| 2006/0203387 A1 | 9/2006 | White et al. |
| 2008/0151436 A1* | 6/2008 | Sato et al. ............... 360/313 |
| 2008/0304184 A1* | 12/2008 | Biskeborn et al. ......... 360/245.8 |
| 2011/0109993 A1 | 5/2011 | Contreras et al. |
| 2011/0116193 A1* | 5/2011 | Gubbins et al. ............ 360/246.2 |
| 2012/0063025 A1* | 3/2012 | Wilson ..................... 360/59 |

* cited by examiner

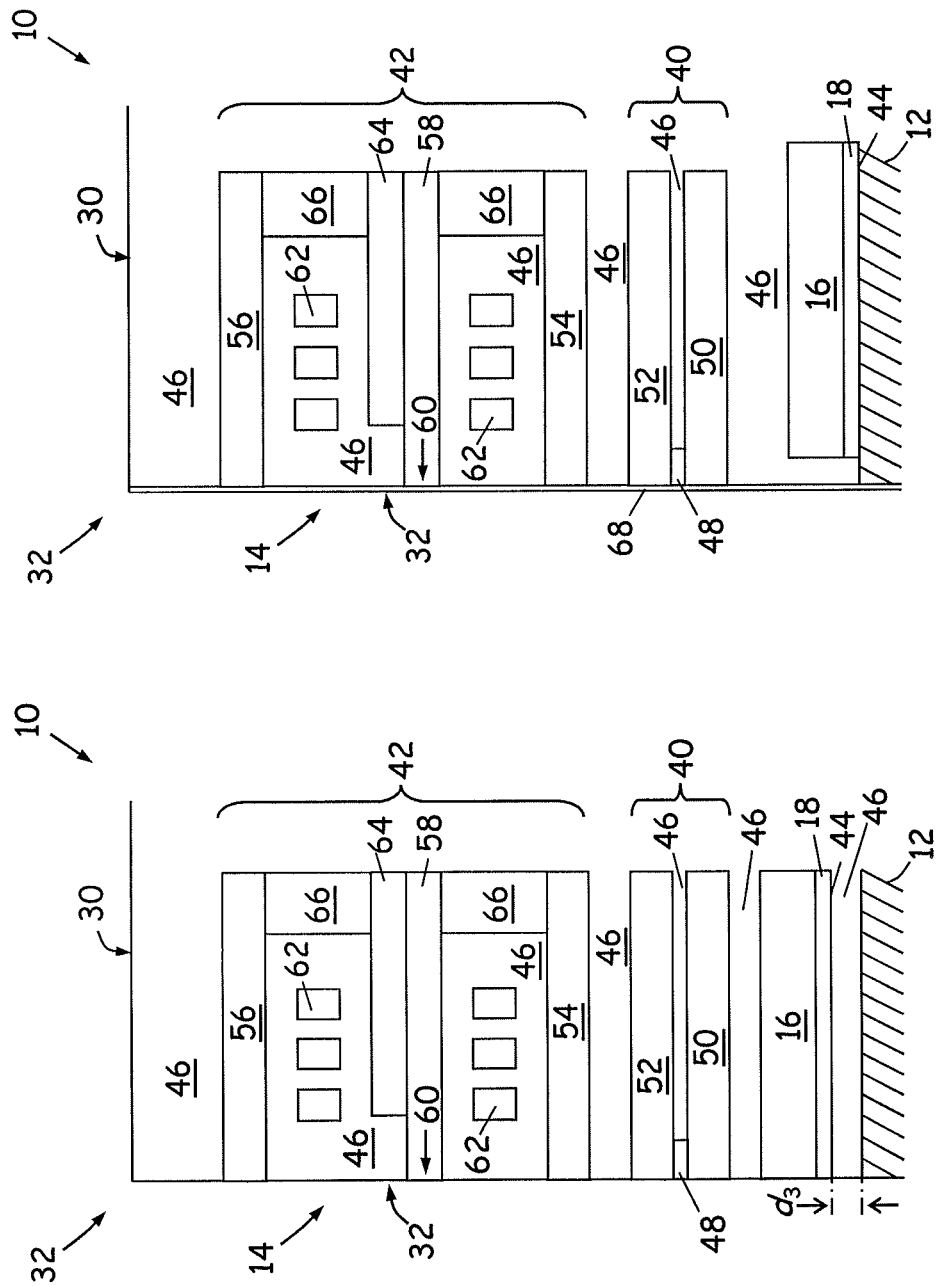

MAGNETIC HEAD WITH INTEGRATED WRITE DRIVER

RELATED APPLICATION

This application is a continuation of copending U.S. patent application Ser. No. 12/618,976 filed on Nov. 16, 2009.

SUMMARY

Various embodiments are directed to an apparatus comprising a slider body, a transducer and a write driver, and a method for forming the apparatus. The transducer is on the slider body, and comprises a writer. The write driver integrated on the slider body and directly connected to the writer.

BRIEF DESCRIPTION OF THE DRAWINGS

FIG. 4A is a cross-sectional view of a magnetic head with a write driver located below the writer elements.

FIG. 4B is a cross-sectional view of another magnetic head with a write driver located below the writer elements.

DETAILED DESCRIPTION

Figure 1:
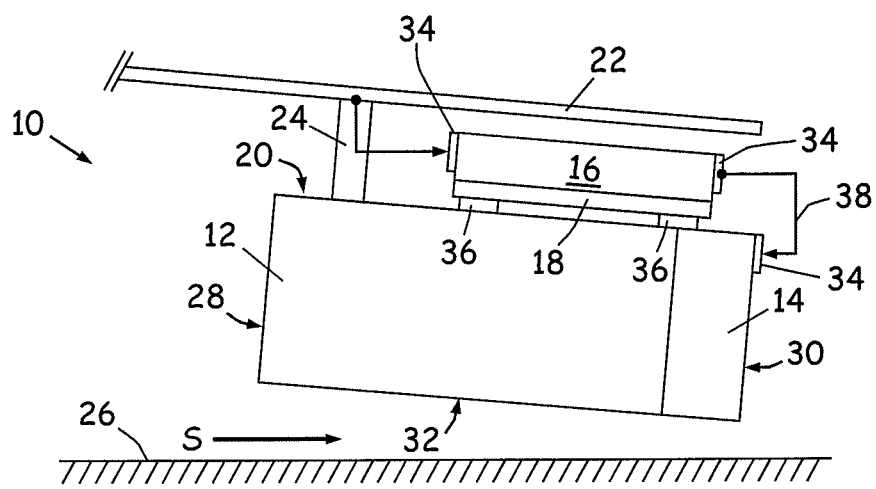
FIG. 1 is a side view of a magnetic head with an integrated write driver.

FIG. 1 is a side view of an example embodiment of a magnetic read/write head 10 with slider body 12, magnetic transducer 14 and integrated write driver 16. In this particular embodiment, write driver 16 is formed on driver substrate 18, and mounted onto external (top) surface 20 of slider body 12.

Slider body 12 is supported by an actuator system with flexure 22 and slider mount 24, such that magnetic head 10 "flies" along windage produced by the motion of magnetic medium 26. Medium 26 translates in tracking direction S with respect to magnetic head 10, from leading edge 28 toward trailing edge 30.

In various disc drive designs, media-facing (bottom) surface 32 provides an air-bearing surface (ABS) to support magnetic head 10, with top surface 20 positioned opposite media-facing surface 32. In other embodiments, media-facing surface 32 supports head 10 on a different fluid such as an inert gas or a lubricant, or, alternatively, media-facing surface 32 forms a contact surface between head 10 and data storage medium 26.

Slider body 12 is formed in some embodiments of a two-phase material comprising a continuous host phase such as a dielectric and a discontinuous included phase, which is selected for desired hardness properties. In one particular embodiment, for example, slider body 12 is formed of a polycrystalline AlTiC material in which the host phase is aluminum oxide ($Al_2O_3$, or alumina) and the included phase is titanium carbide (TiC).

Transducer 14 comprises reader and writer elements for performing data storage operations on magnetic medium 26. The transducer is formed, in various non-limiting embodiments, by thin film deposition onto slider body 12, as described in more detail below.

Depending on embodiment, write driver 16 in some embodiments comprises a current source to generate write current for transducer 14. In some embodiments, external electrode pads 34 connect write driver 16 to a write data buffer or other external data source, in some embodiments via a transmission line connection formed along flexure 22. Additional pads 34 may form an impedance-matching connection between write driver 16 and transducer 14, for example using flexible circuit element 38.

The current source and other elements of write driver 16 are formed by thin film deposition onto substrate 18, which is mountable to slider body 12 using wafer-to-wafer bonding or "pick and place" techniques. In the embodiment of FIG. 1, for example, substrate 18 is mounted to top surface 20 of slider body 12 using an adhesive layer or bond pads 36. Alternatively, write driver 16 is located on leading edge 28, trailing edge 30 or another external (e.g., side) surface of slider body 12.

To accommodate pick-and-place and wafer-to-wafer bonding techniques, substrate 18 in some embodiments has a thickness of about 10 microns or more, for example a thickness of about 20 microns. Alternatively, the thickness of substrate 18 is reduced by ultrathin wafer processing or wafer thinning techniques, and the placement and bonding methods are adapted for a substrate thickness of less than 10 microns, for example about 2-5 microns.

The integration of write driver 16 directly onto magnetic head 10 provides for improved impedance matching between the current source and the write coil, reducing reflections and jitter while improving signal rise time and reducing overshoot. The pick-and place mounting technique also allows the write driver electronics to be independently designed and manufactured, with write driver 16 integrated onto magnetic head 10 at any point before, during or after the head build process used for transducer 14.

In the externally-mounted embodiment of FIG. 1, for example, write driver 16 is in some embodiments mounted after the head build process, and after the wafer is cut into individual slider bodies 12. This increases the available area for microcircuit components on substrate 18 and improves heat dissipation away from slider body 12, while providing additional design flexibility when particular components of write driver 16 are incompatible with one or more of the manufacturing steps used to form transducer 14. Alternatively, write driver 16 is located on trailing edge 30, and substrate 18 is mounted to slider body 12 at any point before, during or after the head build process as described below.

Depending on embodiment, write driver 16 provides microcircuit elements for generating the write current and for forming an impedance-matching connection to the write coil, but data buffering and read signal processing are not necessarily required. This contrasts with fully integrated write driver/preamplifier designs, which perform data buffering and read signal processing, and substantially limits the size footprint and mass envelope of write driver 16 on slider body 12.

In the externally-mounted embodiment of FIG. 1, for example, write driver 16 and substrate 18 have overall dimensions of about 1,000 microns (about 1 mm) or less in length and about 400 microns or less in width; that is, no greater than the corresponding dimensions of slider body 12. In addition, the combined mass of write driver 16 and substrate 18 is less than that of slider body 12, so the flying and suspension properties of magnetic head 10 are not substantially altered. Typically, this allows precision control of pitch angle and media/head spacing to be maintained without material modifications to flexure 22 and the other components of the actuator and suspension assembly.

Figure 2:
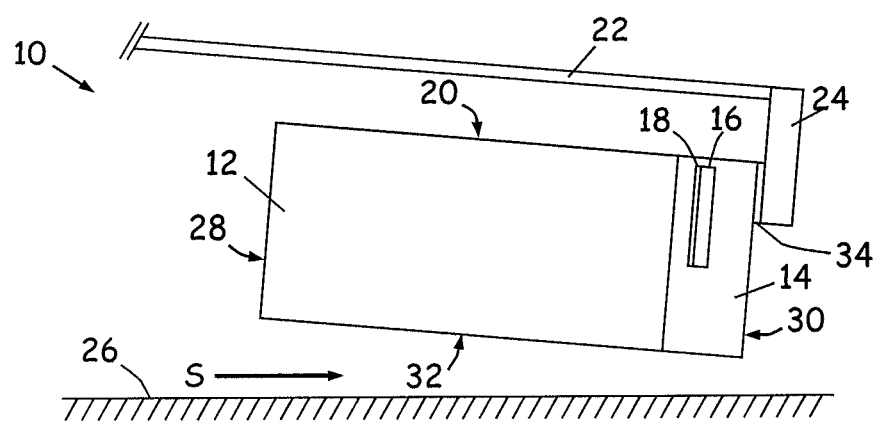
FIG. 2 is a side view of another magnetic head with an integrated write driver.

FIG. 2 is a side view of the magnetic head 10 of FIG. 1, with write driver 16 mounted on trailing edge 30, along with transducer 14. In this embodiment, write driver 16 is integrated onto magnetic head 10 on a wafer level, before slicing and dicing operations to produce individual slider bodies 12. In some embodiments, impedance-matching connections to the write coil are provided by internal traces or conducting vias, as formed inside the body of transducer 14. Alternatively, impedance-matching connections are formed by external pads 34, or by a combination of internal traces and external pads.

In the trailing-edge mounted embodiment of FIG. 2, the dimensions of write driver 16 and substrate 18 are in some embodiments limited to about 400 microns or less in width and about 100 micros or less in height, corresponding to the lateral dimensions of trailing edge 30. This somewhat reduces flexibility in lateral spacing of the write driver elements on substrate 18, but allows write driver 16 to be mounted to slider body 12 at any point during the head build process, reducing manufacturing time and providing for a range of different arrangements with respect to the other elements of transducer 14.

Figure 3A:
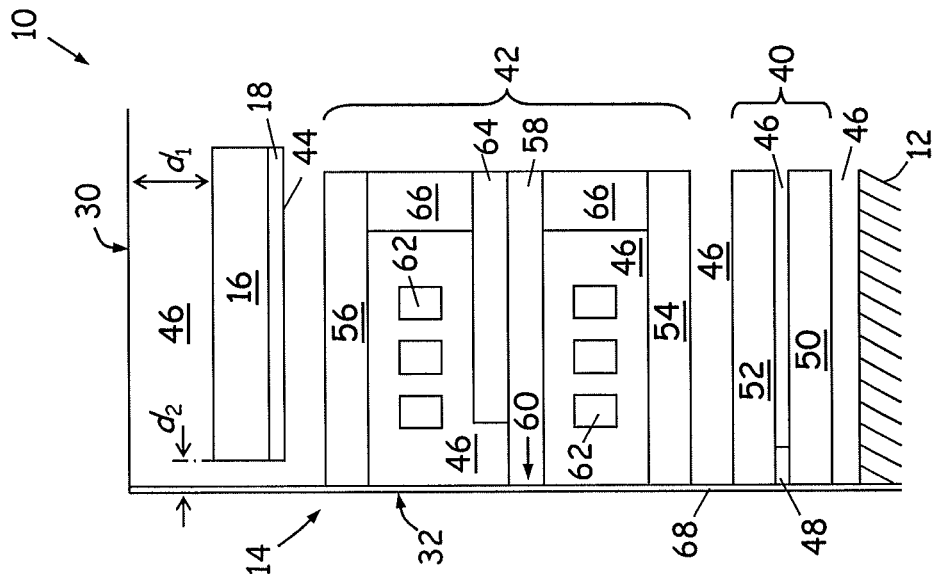
FIG. 3A is a cross-sectional view of a transducer with a write driver mounted on the trailing edge.

FIG. 3A is a cross-sectional view of another embodiment of the magnetic head 10 of FIG. 1, with write driver 16 mounted directly to trailing edge 30, above top dielectric layer(s) 46 of transducer 14. In this embodiment, write driver 16 is mounted after the head build process is complete, and is exposed to provide increased heat dissipation at trailing edge 30, with reduced heat dissipation through the body of transducer 14.

Transducer 14 comprises reader portion (reader) 40 and writer portion (writer) 42. These elements are formed by thin film deposition on the trailing surface of slider body 12, such that transducer 14 extends to approximately trailing edge 30 of magnetic head 10.

Write driver 16 is formed on substrate 18, which is mounted to transducer 14 via pick and place or wafer bonding techniques using bond pads or adhesive layer 44. As shown in FIG. 3A, for example, adhesive layer or bond pads 44 comprise an organic or hybrid bonding compound such as benzocyclobutene (BCB), an SU8 epoxy resin, or a silver epoxy material, which bonds substrate 18 to a layer of nonmagnetic insulator or dielectric 46, with write driver 16 located above reader 40 and writer 42 (that is, opposite slider body 12).

Depending on embodiment, reader 40 comprises read sensor 48 with read shields 50 and 52. Read sensor 48 in some embodiments comprises a magnetoresistive (MR) spin valve or other MR sensing element configured for perpendicular or longitudinal read operations. In general, the data are decoded as a function of a sense current across MR element 48, in which the resistance (and thus the voltage) depend upon magnetization orientations in the bit pattern, taking advantage of one or more MR effects including anisotropic magnetoresistance (AMR), giant magnetoresistance (GMR), tunneling magnetoresistance (TMR) and colossal magnetoresistance (CMR).

First (bottom) read shield 50 and second (top) read shield 52 are oriented transversely to media-facing surface 32, and are formed of a soft magnetic shield material such as a nickel-iron (NiFe) or nickel-cobalt-iron (NiCoFe) alloy in order to improve reader sensitivity by absorbing stray magnetic flux. Read sensor 48 is in some embodiments formed as a multilayer MR stack that extends perpendicularly from media-facing surface 32 between read shields 50 and 52. Dielectric material 46 (or another nonmagnetic insulator) extends from the distal end of MR sensor 48 (that is, opposite media-facing surface 32), in the read gap between read shields 50 and 52.

In current-perpendicular-to-plane (CPP) embodiments, MR sensor 48 typically spans the read gap between read shields 50 and 52, which also function as electrical contacts for the sense current. In this embodiment, the current propagates in a substantially perpendicular sense through the layers of the MR stack. In current-in-plane (CIP) configurations, additional side contacts (not shown) are used to conduct the sense current in a substantially parallel sense through the stack layers, and MR sensor 48 is spaced from read shields 50 and 52 by additional layers of dielectric 46. Other reader designs are also configurable for use with the integrated write driver designs described herein.

Depending on embodiment, writer 42 comprises first (leading) return pole 54, second (trailing) return pole 56 and main (write) pole 58, with pole tip 60 formed on the proximal end of write pole 58 and oriented toward media-facing surface 32. Write pole 58 is formed of a magnetically soft, high magnetic moment material such as a cobalt-iron (CoFe) alloy, in order to direct magnetic flux through pole tip 60 and across media-facing surface 32.

One or more sets of coils 62 are inductively coupled to write pole 58. Coils 62 are in some embodiments formed of a low resistivity material such as copper (Cu), and positioned about write pole 58 and yoke 64 (or back vias 66) in order to generate time-varying magnetic flux when energized by a switching write current or write pulse, as provided by write driver 16.

Yoke 64 and write pole 58 extend from media-facing surface 32 to distal ends proximate back vias 66. Yoke 64 and back vias 66 are formed of a magnetically soft material such as NiFe or NiCoFe, in order to improve flux delivery to write pole 58 and pole tip 60. In some embodiments, writer 42 also includes one or more top, bottom or side shields to improve sensitivity or provide additional field shaping. Other writer designs are also configurable for use with the integrated write driver designs described herein.

Dielectric material 46 surrounds write pole 58, insulating coils 62 and spacing write pole tip 60 from return poles 54 and 56. Protective layer 68 covers pole tip 60 and other elements of reader 40 and writer 42 at media-facing surface 32, in some embodiments providing a diamond-like coating (DLC) or encapsulant, or both, to protect sensitive structures and reduce hard particle contamination.

Reader 40 and writer 42 are formed as a number of closely spaced layers, in some embodiments by thin film deposition onto slider body 12. In the stacked configuration of FIG. 3A, for example, writer 42 is stacked on top of reader 40, with first (bottom) return pole 54 spaced from second (top) read shield 52 by a layer of dielectric insulator 46. Alternatively, top read shield 52 is merged with first return pole 54m or, in side-by-side designs, reader 40 and writer 42 are laterally spaced from one another along media-facing surface 32, and have a substantially coplanar configuration.

In operation magnetic head 10, writer 42 writes data in response to a current generated by write driver 16. Write driver 16 drives the write current through coils 62, which generate magnetic flux in yoke 64 and write pole 58. Flux loops exit write pole 58 at pole tip 60, crossing media-facing surface 32 to enter the recording medium and close back through one or both of return poles 54 and 56, and through one or both of magnetic vias 66. Magnetic domain orientations in the recording medium are determined by the polarity of the write current generated by write driver 16, allowing writer 42 to record a bit pattern as a function of the switching write current.

Figure 3B:
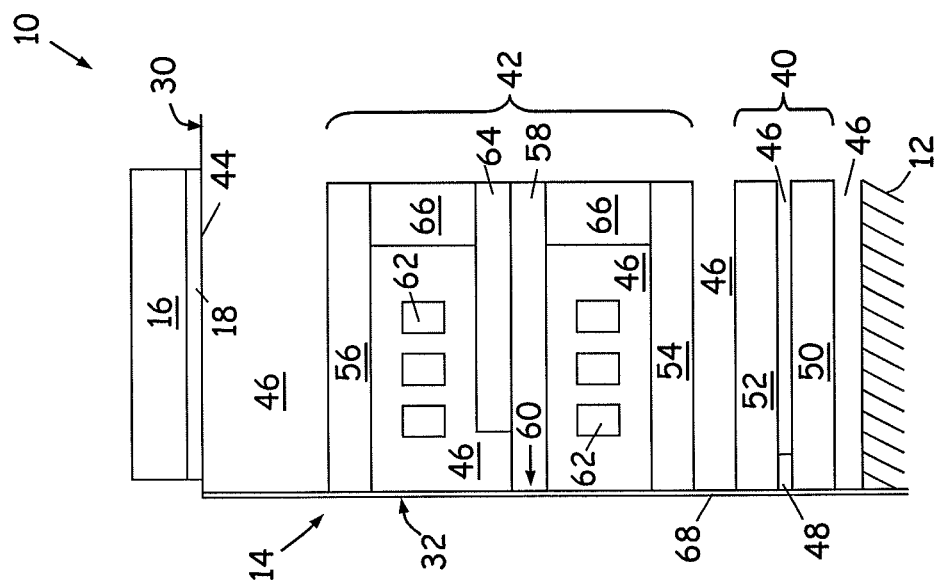
FIG. 3B is a cross-sectional view of a magnetic head with a write driver located on top of the writer elements.

FIG. 3B is a cross-sectional view of an embodiments of the magnetic head 10 of FIG. 1 with write driver 16 located within the body of transducer 14. In this particular embodiment, write driver 16 is spaced from trailing edge 30 by a layer of nonmagnetic insulator/dielectric 46.

As shown in FIG. 3B, substrate 18 is mounted after the head build process is substantially complete, but before the deposition of the top layer(s) of dielectric 46 at trailing edge 30. This allows for fully internal impedance-matching connections between write driver 16 and coil 62 of writer 42. In addition, dielectric 46 provides protective layers of thickness $d_1$ and $d_2$, respectively, between write driver 16 and one or both of trailing edge 30 and media-facing surface 32.

The particular location of write driver 16 with respect to reader 40 and writer 42 depends on head design and processing considerations, thermal dissipation requirements, and the location of power, signal and grounding connections to coils 62. In addition, depending upon location of the respective elements, the impedance-matching connection between write driver 16 and writer 42 utilizes various internal conducting traces, vias, external bonding pads and combinations thereof, as described above with respect to FIGS. 1 and 2, and as further illustrated below with respect to FIGS. 5A, 5B and 5C.

FIG. 4A is a cross-sectional view of the example magnetic head 10, with write driver 16 located below reader 40 and writer 42, between slider body 12 and first (bottom) read shield 50. In this embodiment, write driver substrate 18 is mounted relatively early in the head build process, but after deposition of dielectric layer 46, which spaces write driver 16 and substrate 18 from the trailing surface of slider body 12. The impedance-matching connection is in some embodiments formed internally to the body of transducer 14, and relatively more heat is dissipated through slider body 12 than in the top-mounted configurations of FIGS. 3A and 3B, above.

FIG. 4B is an alternate side view of magnetic head 10, with write driver 16 mounted directly to slider body 12, for example using bond pads or adhesive layer 44. In this embodiment, heat dissipation through slider body 12 is increased, with relatively less heat transfer through the body of transducer 14. Comparison of FIG. 4B to FIG. 4A also illustrates that in some embodiments media-facing surface 32 is provided with protective layer 68, while in other embodiments media-facing surface 32 is formed without a protective layer.

In both the external-surface mounted configuration of FIG. 1 and FIG. 3A, and in the transducer-mounted embodiments of FIGS. 2, 3B, 4A and 4B, the integration of write driver 16 onto magnetic head 10 provides a shorter, more direct connection to writer 42, with better impedance matching and reduced timing jitter. This reduces power requirements while producing a more uniform bit pattern, enabling faster, more reliable readback with improved SNR and lower BER.

Figure 5A:
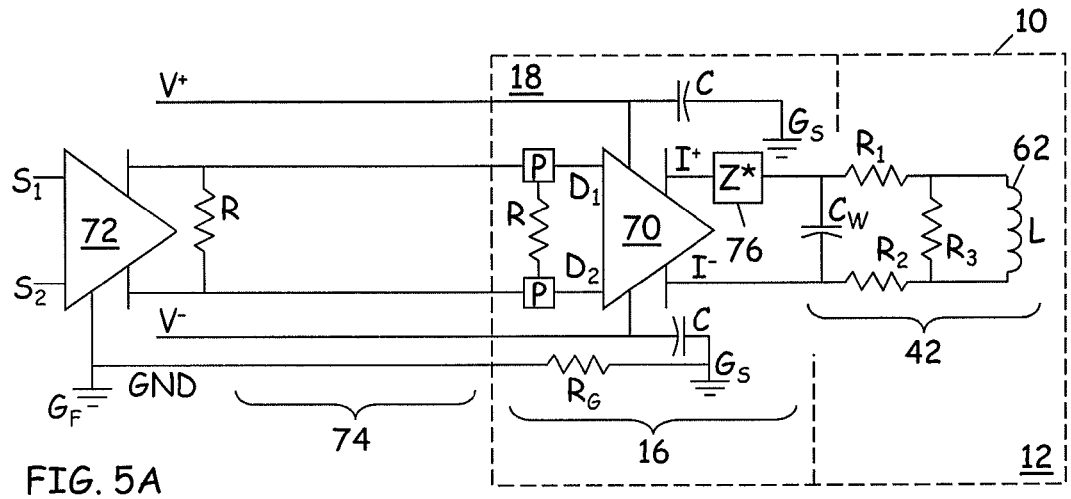
FIG. 5A is a circuit diagram for a write driver.

FIG. 5A is a circuit diagram for write driver 16, illustrating an impedance-matching connection to writer 42. Write drive 16 is formed on substrate 18, which is located on magnetic head 10.

In this embodiment, write driver 16 comprises current source 70 with a direct (on-slider) impedance-matching connection to coil 62 and an external (off-slider) connection to write data buffer (prebuffer) 72, for example utilizing a transmission line connection along flex circuit 74. Microelectronic current source 70 comprises thin-film transistor (three-terminal) or diode (two-terminal) components, or both, with differential (bi-polar) current outputs I+ and I−. In the particular embodiment of FIG. 5A, current source 70 has differential digital inputs D1 and D2, and is powered by differential (two-ended) supply lines V+ and V−.

Prebuffer 72 is located off magnetic head 10, for example mounted on the suspension/actuator assembly, or integrated onto flex circuit 74. Prebuffer 72 comprises a data buffer for buffering write data inputs S1 and S2, and a signal generator for transmitting write signals D1 and D2 to write driver 16, based on the buffered data.

Writer 42 is located on the trailing edge of slider body 12, and is represented here by an equivalence circuit with inductance L and series resistances $R_1$ and $R_2$, parallel (leakage) resistance $R_3$ and capacitance $C_W$. These parameters model not only coil 62 but also reflect the complex (phase-dependant) impedance of writer 42, including the particular physical configuration of coil 62 with respect to the main pole, yoke, shields and other write head components.

Flex circuit 74 provides power, ground and data connections between prebuffer 72 and current source 70. Digital write signals D1 and D2 are connected to current source 70 via data pads P. Impedance-matching resistors R are sometimes provided to reduce reflections at current source 70 and prebuffer 72, for example reflections from transistor-transistor logic (TTL) devices and other high-impedance elements.

Power supply lines V+ and V− are connected across slider ground $G_S$ using bypass capacitors C, which prevent voltage drop during high-speed write cycles. This enables a faster rise time for write current outputs I+ and I−, as compared to a relatively slower (essentially DC) response of power lines V+ and V− across flex circuit 74. Ground connection GND is in some embodiments provided between flex circuit ground $G_F$ and slider ground $G_S$, sometimes with ground resistance $R_G$ to reduce cross-talk or the tendency to form ground loops.

Impedance-matching element(s) 76 are sometimes connected between current outputs I+ and I− of current source 70 and coil 62 of writer 42, with complex impedance Z* to improve response time and increase voltage transfer while reducing reflections and power dissipation. In general, impedance-matching elements 76 include resistive, inductive or capacitive (RLC) components, or a combination thereof, for matching the complex impedance of writer 42 according to the desired transmission characteristics between current source 70 and coil 62. These RLC components are coupled in series or parallel (or both) with respect to current outputs I+ and I− (compare, e.g., FIGS. 5B and 5C), and positioned according to desired connection properties and the available real estate on write driver substrate 18 and slider body 12.

In general, resistive loads associated with writer 42 are addressed via broadband matching to reduce reflections, and reactive loads are addressed by complex conjugate matching to increase power transfer. Both techniques are relevant to writer response, because power delivery is a critical factor in writer performance and because sharp write transitions implicate a broad Fourier spectrum, so impedance matching must address a broadband frequency range. Resistive impedance bridging techniques are also utilized, for example when voltage transfer is a limiting factor in overall writer performance.

In contrast to off-slider (non-integrated) write driver designs, the signal transmission length between current source 70 and coil 62 is relatively short, for example about 1,000 microns (1 mm) or less, as compared to off-slider transmission lines (e.g., flex circuit 74) that extend for lengths of a few mm or more, or 1 cm or more. This limits both the resistive and reactive impedance of the write loop, allowing impedance matching to be achieved within the relatively small available area on write driver substrate 18 and slider body 12.

Shorter transmission paths also limit dispersion in the write current signal, reducing jitter and improving response time by maintaining sharper, more uniform write pulses with reduced power dissipation. In addition, better impedance matching between write driver 16 and writer 42 also reduces overshoot (that is, when the leading edge of the write signal spikes above the write plateau), further reducing jitter and unnecessary power dissipation without increasing response time.

Figure 5B:
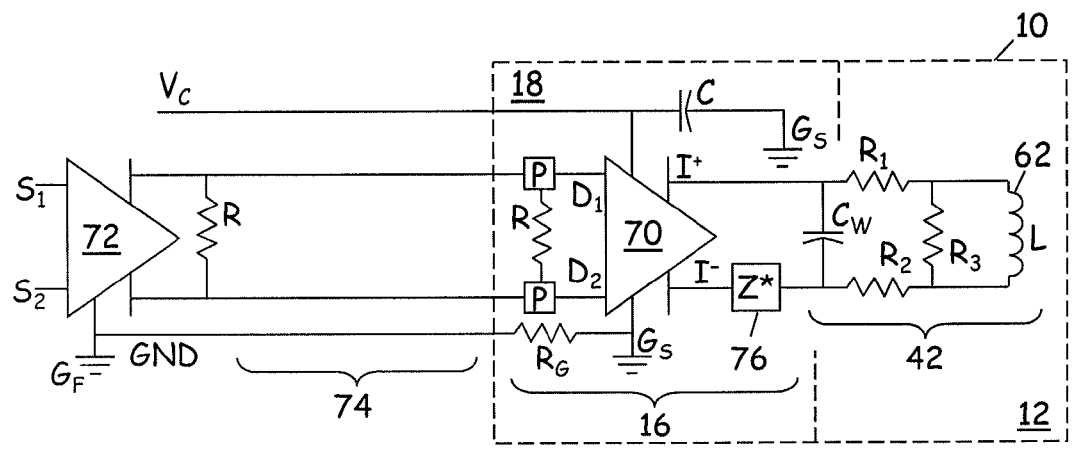
FIG. 5B is an alternate circuit diagram for a write driver.

FIG. 5B is an alternate circuit diagram for write driver 16, in an embodiment having single-ended power source $V_C$, buffered with bypass capacitor C across slider ground $G_S$. In this configuration, current source 70 is connected directly across line $V_C$ and slider ground $G_S$, with impedance-matching elements 76 provided between write driver 16 and writer 42.

Figure 5C:
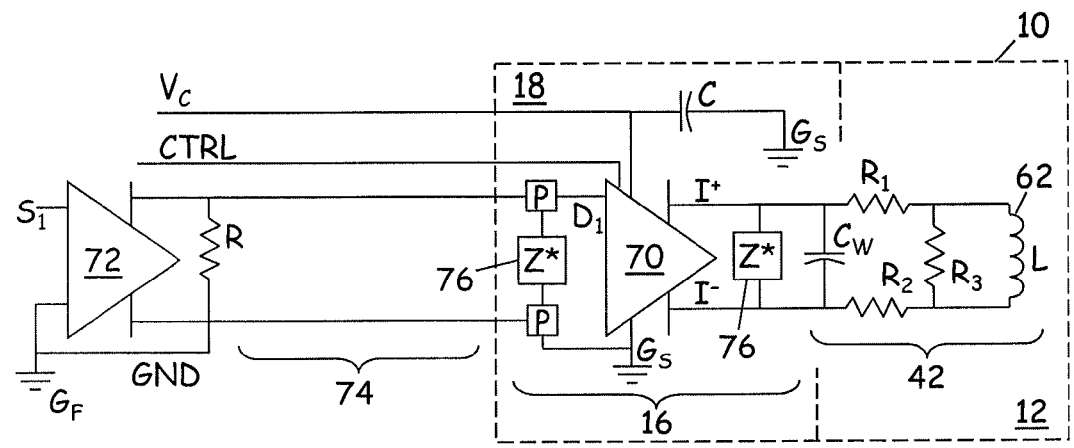
FIG. 5C is another alternate circuit diagram for a write driver.

FIG. 5C is another alternate circuit diagram for write driver 16, in an embodiment having single-sided data input D1. In this embodiment, write data input S1 is either single-sided (as shown) or double-sided (differential), and the data transmission line is connected across flex circuit ground $G_F$ at prebuffer 72 and slider ground $G_S$ at current source 70. In addition complex impedance matching elements 76 are used to increase power or voltage transfer from prebuffer 72 to write driver 16 and current source 70.

FIG. 5C also illustrates the use of control line CTRL for additional write driver functionality. Typical control applications include a scaling signal for scaling current outputs I+ and I−, or for "zeroing" (turning off) current source 70 during non-write operations such as data reads, disc idling and load/unload or shutdown events. Additional control functions including a shaping signal for current outputs I+ and I−, for example to improve rise time or control overshoot, or to adapt the write current signal to the particular impedance properties of writer 42 and impedance-matching elements 76.

The response and rise times of current outputs I+ and I− (and thus the attainable SNR, BER and data rate) also depend upon the semiconductor properties of current source 70 and the other components of write driver 16. These properties include band gap, breakdown potential, electron/hole mobility and electron/hole saturation velocity of the relevant semiconductor materials, for which representative values are given in Table 1.

TABLE 1

Semiconductor Properties (Representative Values)

| Material | Band Gap (eV) | Breakdown Potential (min) ($10^5$ V/cm) | Mobility (min) ($10^3$ cm$^2$/V·s) | | Saturation Velocity (min) ($10^7$ cm/s) | |
|---|---|---|---|---|---|---|
| | | | e | hole | e | hole |
| Si | 1.12 | 3 | 1.5 | 0.6 | 1 | 0.7 |
| GaAs | 1.42 | 4 | 8 | 0.4 | 0.8 | 0.9 |
| InP | 1.35 | 5 | 5 | 0.2 | 0.7 | 0.5 |
| In$_{0.5}$Ga$_{0.5}$As | 0.75 | 0.4-1.0 | 12 | 0.3 | 0.7 | 0.5 |
| GaN | 3.40 | 30 | 1.2 | 0.05 | 1.5 | 0.5 |
| InS | 0.36 | 0.4 | 25 | 0.5 | 0.9 | 0.5 |

The pick-and place mounting techniques described herein provide substantial flexibility in the selection of these semiconductor materials, independently of those used for the head build process of writer 42 and the other component of read/write head 10. In some embodiments, for example, slider body 12 comprises a polycrystalline AlTiC substrate, as described above, while write driver substrate 18 comprises a single-crystalline silicon-based (Si) or silicon-on-insulator (SOI) material. This allows write driver 16 to utilize silicon-based microelectronic components, some of which are not easy to form on a polycrystalline or non Si-based slider body material.

Alternatively, write driver 16 and substrate 18 comprise a different combination of compatible gallium (Ga) or indium (In) based substrate and semiconductor materials, including, but not limited to, gallium arsenide (GaAs), indium phosphide (InP), indium-gallium arsenide (e.g., In$_{0.5}$Ga$_{0.5}$As), gallium nitride (GaN), and indium sulfide (InS). In these embodiments, the relevant semiconductor properties vary accordingly, as illustrated by Table 1. In further embodiments, substrate 18 is formed as a multi-component structure having two or more different substrate materials, for example to accommodate both silicon-based and non-silicon (e.g., Ga or In) based semiconductor components.

Figure 6A:
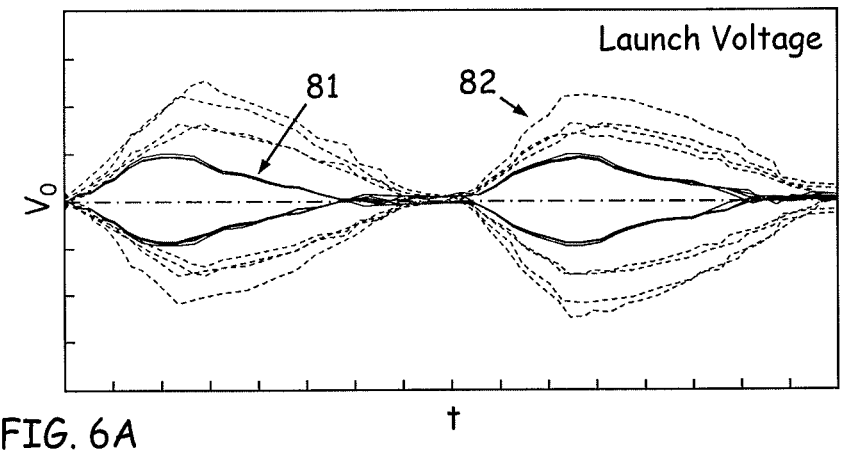
FIG. 6A is series of plots of launch voltage versus time, comparing a direct write driver interconnect to an indirect transmission line connection.
Figure 6B:
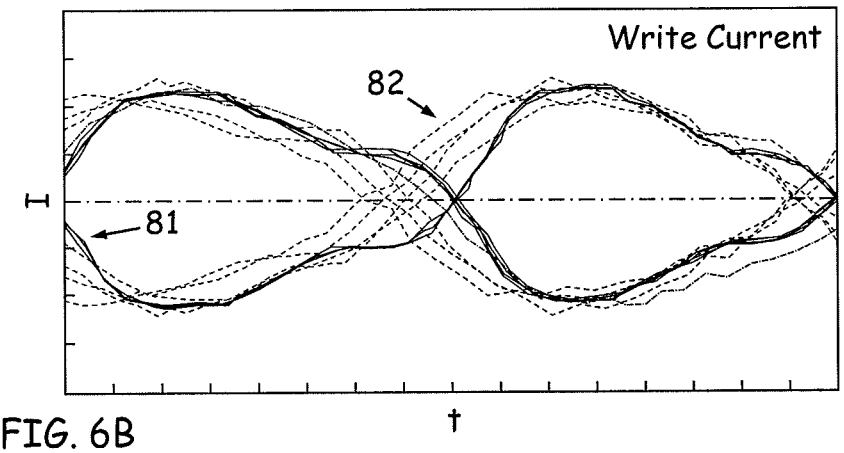
FIG. 6B is a series of plots of write current versus time, comparing direct and indirect write driver connections.

FIGS. 6A-6B are plots of launch voltage, write current and write power versus time, respectively, illustrating the effect of a direct (on-slider) impedance-matching connection between the write driver and the write coil, as compared to an indirect (off-slider) transmission line connection. Launch voltage $V_O$, write current I and power dissipation PWR are shown on the vertical axes with time (t) on the horizontal, and with all axes scaled in arbitrary units.

Representative plots for the direct impedance-matching connection (solid lines 81) and the indirect transmission line connection (dashed lines 82) were obtained by a combination of bench testing and computer modeling. For an integrated write driver located directly on the read/write head, as described above, the connection length between the current source and the write coil is in some embodiments about 1,000 microns (1 mm) or less, or about 400 microns or less in trailing edge-mounted configurations. For the indirect transmission-line (off-slider) comparison, the connection length is in some embodiments a few mm or more, or 1 cm or more.

As shown in FIG. 6A, launch voltage $V_O$ (as measured at the current source) is less for the direct impedance-matching connection (solid lines 81) than for the indirect transmission line (dashed lines 82). This reduces overshoot, and provides for better voltage matching and power deliver to the write coil.

As shown in FIG. 6B, the reduction in launch voltage $V_O$ does not substantially affect the amplitude of write current I (the difference between differential outputs I+ and I− at write coil 62; see FIGS. 5A-5C). In particular, the maximum write current is substantially similar for the direct impedance-matching connection (solid lines 81) and the indirect or transmission line connection (dashed lines 82), producing the same degree of write pole magnetization with lower launch voltage $V_O$.

In addition, shorter transmission length and better impedance matching result in reduced or limited dispersion in the write pulse, improving rise time and decreasing jitter. Sharper, more uniform write pulses, in turn, improve both the SNR and BER.

Figure 6C:
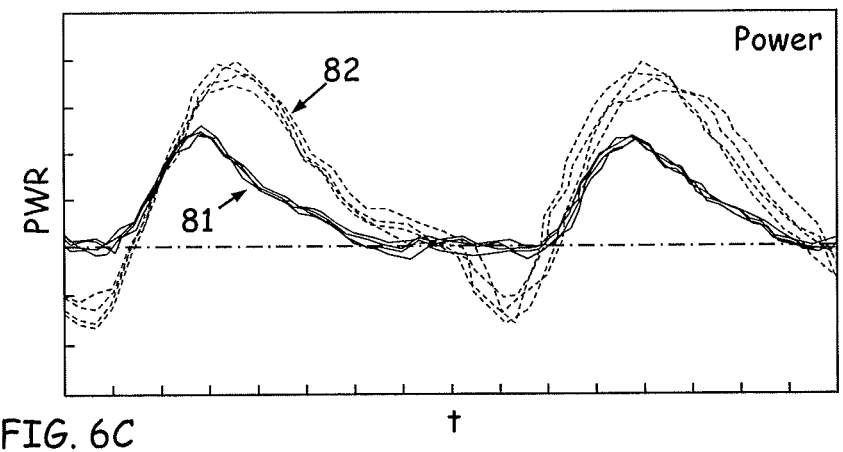
FIG. 6C is a series of plots of write power versus time, comparing direct and indirect write drive connections.

As shown in FIG. 6C, power dissipation PWR is substantially lower for the direct impedance-matched connection. Reduced power consumption not only increase battery life and enhances "green drive" design flexibility, but also lowers heat dissipation in write driver 16 and writer 42. This allows for smaller, more compact head designs, with reduced thermal effects on fly height and pitch angle.

Generally, power dissipation PWR is approximately the product of launch voltage $V_0$ and write current I, but the particular result depends on signal phase and other impedance-matching effects. In one particular embodiment, for example, write current I is about 120 mA and launch voltage $V_0$ (that is, the write voltage) is about 710 mV, with power dissipation PWR of about 85 mW or less. In other embodiments, write current I is about 100 mA or more and launch voltage $V_0$ is about 750 mV or less, with power dissipation PWR maintained at about 100 mW or less, or about 85 mW or less, depending on the voltage, power and current transmission characteristics of the impedance-matching connection to the write coil.

While this disclosure has been described with reference to particular embodiments, the terminology used is for the purposes of description, not limitation. Workers skilled in the art will recognize that changes may be made in form and detail without departing from the spirit and scope of the discussed technology, including the substitution of various equivalents for particular elements and adaptation of the teachings to different materials, situations and circumstances. Thus the present disclosure is not limited to the particular embodiments disclosed herein, but encompasses all embodiments falling within the scope of the appended claims.

What is claimed:

1. An apparatus comprising a data transducer attached to a slider body on an air bearing surface (ABS), the data transducer connected to a write driver mounted on the slider body, the write driver separated from the ABS, slider body, a slider mount, and a flexure, the slider mount being the only connection between the slider body and the flexure.

2. The apparatus of claim 1, wherein a bottom surface of the slider body corresponds with the ABS, the write driver attached to and separated from a top surface of the slider body, the top surface opposite the bottom surface.

3. The apparatus of claim 1, wherein the data transducer and slider body are each positioned on the ABS.

4. The apparatus of claim 1, wherein first and second bond pads contact the slider body and a driver substrate, the driver substrate separated from the slider body and in contact with the write driver.

5. The apparatus of claim 1, wherein the data transducer comprises a data writer element and a data reader element.

6. The apparatus of claim 1, wherein the write driver has first and second separate bond pads each positioned on one or more external surfaces of the write driver, the first bond pad electrically connected to the flexure, the second bond pad electrically connected to the data transducer.

7. The apparatus of claim 1, wherein a write data input provides a data signal to the write driver.

8. An apparatus comprising a data transducer attached to a slider body on an air bearing surface (ABS), the data transducer connected to a write driver mounted on the slider body, the write driver separated from the ABS, a flexure, a slider mount, and a slider mount, the slider mount being the only connection between the slider body and the flexure, at least one bond pad physically separating the write driver from the slider body and data transducer.

9. The apparatus of claim 8, wherein the write driver has a ground connection independent of the slider body and data flexure.

10. The apparatus of claim 8, wherein the write driver comprises a current source and impedance-matching element.

11. The apparatus of claim 10, wherein the current source is formed of a non-silicon based semiconductor material having a minimum electron mobility of about five thousand centimeters squared per volt-second.

12. The apparatus of claim 10, wherein the impedance-matching element comprises resistive, inductive, and capacitive components.

13. The apparatus of claim 10, wherein the impedance-matching element matches a resistive impedance of the data transducer to provide a write current between 100-120 mA.

14. The apparatus of claim 10, wherein the impedance-matching element comprises a reactive element that matches a reactive impedance of the data transducer to provide a power dissipation value of about 100 mW or less.

15. The apparatus of claim 8, wherein the write driver comprises a high-impedance data input for delivering write signals to the write driver and the impedance-matching element matches impedance across the high impedance data input.

16. The apparatus of claim 8, wherein the write driver comprises a single-ended power input for delivering power to the current source and a bypass capacitor for buffering the single-ended power input.

17. An apparatus comprising a data transducer attached to a slider body on an air bearing surface (ABS), the data transducer connected to a write driver mounted on the slider body, the write driver separated from the ABS, slider body, a slider mount, and a flexure, the slider mount being the only connection between the slider body and the flexure, the write driver electrically connected to the data transducer by a flexible circuit element.

18. The apparatus of claim 17, wherein at least one impedance-matching element provides an impedance-matched connection between the write driver and the data transducer.

19. The apparatus of claim 17, wherein the write driver is physically mounted on an external surface of the slider body via an adhesive layer.

20. The apparatus of claim 17, wherein the write driver is physically larger than the data transducer and has overall dimensions of 1000 microns or less in length and 400 microns or less in width.

* * * * *

UNITED STATES PATENT AND TRADEMARK OFFICE
CERTIFICATE OF CORRECTION

PATENT NO. : 9,269,377 B2  
APPLICATION NO. : 14/575288  
DATED : February 23, 2016  
INVENTOR(S) : Mark Anthony Gubbins and Todd Michael Lammers It is certified that error appears in the above-identified patent and that said Letters Patent is hereby corrected as shown below:

Claims

In Col. 10, line 1, claim 8,
delete "slider"

In Col. 10, line 2, claim 8,
"mount, and a slider mount," should be "and a slider mount,"

Signed and Sealed this
Third Day of May, 2016

Michelle K. Lee
*Director of the United States Patent and Trademark Office*